US005486695A

United States Patent [19]
Schultz et al.

[11] Patent Number: 5,486,695
[45] Date of Patent: Jan. 23, 1996

[54] STANDOFF COMPENSATION FOR NUCLEAR LOGGING WHILE DRILLING SYSTEMS

[75] Inventors: Ward E. Schultz, Fulshear; Gordon L. Moake, Houston, both of Tex.

[73] Assignee: Halliburton Company, Dallas, Tex.

[21] Appl. No.: 219,062

[22] Filed: Mar. 29, 1994

[51] Int. Cl.⁶ .................................................. G01V 5/04
[52] U.S. Cl. ........................... 250/261; 250/254; 250/256; 250/262
[58] Field of Search .................................... 250/254, 256, 250/261, 262, 264, 265, 266, 268

[56] References Cited

U.S. PATENT DOCUMENTS

| | | |
|---|---|---|
| Re. 32,913 | 4/1989 | Clark . |
| 4,047,027 | 9/1977 | Bateman et al. ........................ 250/264 |
| 4,326,129 | 4/1982 | Neufeld .................................. 250/262 |
| 4,388,529 | 6/1983 | Peelman ................................. 250/270 |
| 4,409,481 | 10/1983 | Smith, Jr. et al. ...................... 250/270 |
| 4,423,323 | 12/1983 | Ellis et al. .............................. 250/264 |
| 4,424,444 | 1/1984 | Smith, Jr. et al. ...................... 250/270 |
| 4,441,362 | 4/1984 | Carlson . |
| 4,503,328 | 3/1985 | Neufeld .................................. 250/262 |
| 4,524,274 | 6/1985 | Scott ................................. 250/262 X |
| 4,655,299 | 4/1987 | Schoeffler ............................... 175/38 |
| 5,091,644 | 2/1992 | Minette .................................. 250/254 |
| 5,130,950 | 7/1992 | Obran et al. . |
| 5,175,429 | 12/1992 | Hall, Jr. et al. ........................ 250/262 |
| 5,214,251 | 5/1993 | Orban et al. . |
| 5,250,806 | 1/1993 | Rhein-Knudsen et al. ............. 250/254 |
| 5,317,111 | 5/1994 | Orban et al. . |
| 5,354,956 | 10/1994 | Orban et al. . |
| 5,357,797 | 10/1994 | Maki, Jr. et al. .................. 250/264 X |

FOREIGN PATENT DOCUMENTS

| | | |
|---|---|---|
| 314573 | 3/1989 | European Pat. Off. . |
| 225262 | 8/1992 | United Kingdom . |

OTHER PUBLICATIONS

J. Labo; *A Practical Introduction to Borehole Geophysics;* (86 pg.); Society of Exploration Geophysicists.
D. R. Skinner; *Introduction to Petroleum Production;* (18 pg.); vol. 1, Reservoir Engineering, Drilling, Well Completions.
Samantha Miller, Anadrill; *State of the Art in MWD;* 19 Jan. 1993; International MWD Society; (28 pg).
J. R. Birchak, R. G. Matthews, G. L. Moake & W. E. Schultz; *Standoff and Caliper Measurements While Drilling Using a New Formation–Evaluation Tool with Three Ultrasonic Transducers;* (1993) Society of Petroleum Engineers, Inc. (pp. 793–806).
Michael L. Gartner; *Neutron Porosity Measurement While Drilling;* IEEE Transactions on Nuclear Science, vol. 35, No. 1, Feb. 1988, pp. 839–843.

*Primary Examiner*—Carolyn E. Fields
*Assistant Examiner*—Edward J. Glick
*Attorney, Agent, or Firm*—Michael F. Heim; Eugene Montalvo

[57] ABSTRACT

A standoff compensation system is disclosed for use in an LWD system implementing gamma density and/or neutron porosity measurements. An acoustic transducer is provided to measure the standoff distance between the logging tool and the borehole wall. The present invention includes a downhole processor for determining a weighting factor for the density and/or porosity measurements based upon the measured standoff distance. The weighting factor can either be calculated by the downhole processor according to a predetermined weighting function, or can be retrieved from a pre-calculated look-up table in ROM. The processor then multiplies the weighting factor by the count data from the sensor to determine a weighted count value. The weighted count values are accumulated during an averaging period and normalized, so that a single normalized count value can be generated and either stored in downhole memory, used immediately, or transmitted by telemetry to the surface.

30 Claims, 11 Drawing Sheets

STANDOFF COMPENSATION FOR NUCLEAR LOGGING WHILE DRILLING SYSTEMS

BACKGROUND OF THE INVENTION

The present invention relates generally to a system for determining formation characteristics during the drilling of a well. More particularly, the present invention relates to a system for increasing the accuracy of measurements made using nuclear radiation sensors, including particularly neutron porosity and gamma density measurements. Still more particularly, the present invention relates to an improved secondary measurement system for determining tool displacement or "standoff" from the borehole wall, to precisely weight the nuclear radiation measurements based upon standoff distances, thereby improving the accuracy of those measurements.

Modern petroleum drilling and production operations demand a great quantity of information relating to parameters and conditions downhole. Such information typically includes characteristics of the earth formations traversed by the wellbore, in addition to data relating to the size and configuration of the borehole itself. The collection of information relating to conditions downhole, which commonly is referred to as "logging," can be performed by several methods. Oil well logging has been known in the industry for many years as a technique for providing information to a driller regarding the particular earth formation being drilled. In conventional oil well wireline logging, a probe or "sonde" is lowered into the borehole after some or all of the well has been drilled, and is used to determine certain characteristics of the formations traversed by the borehole. The sonde may include one or more sensors to measure parameters downhole and typically is constructed as a hermetically sealed steel cylinder for housing the sensors, which hangs at the end of a long cable or "wireline." The cable or wireline provides mechanical support to the sonde and also provides an electrical connection between the sensors and associated instrumentation within the sonde, and electrical equipment located at the surface of the well. Normally, the cable supplies operating power to the sonde and is used as an electrical conductor to transmit information signals from the sonde to the surface. In accordance with conventional techniques, various parameters of the earth's formations are measured and correlated with the position of the sonde in the borehole, as the sonde is pulled uphole.

The sensors used in a wireline sonde usually include a source device for transmitting energy into the formation, and one or more receivers for detecting the energy reflected from the formation. Various sensors have been used to determine particular characteristics of the formation, including nuclear sensors, acoustic sensors, and electrical sensors. See generally J. Lab, *A Practical Introduction to Borehole Geophysics* (Society of Exploration Geophysicists 1986); D. R. Skinner, *Introduction to Petroleum Production*, Volume 1, at 54–63 (Gulf Publishing Co. 1981). Nuclear sensors commonly are used to measure neutron porosity and gamma-gamma density of the formation.

The neutron porosity sensor includes a chemical source, which scatters neutrons into the formation. Hydrogen nuclei in the formation slow the neutrons down, and various chemical elements capture the slowed neutrons. When a neutron is captured, a gamma ray is emitted. Slowed neutrons and/or capture gamma rays generally are detected at a near receiver and a far receiver (with respect to the source), thereby indicating the presence of hydrogen in the formation under evaluation. In most instances, the only hydrogen in a formation is that found in water and hydrocarbons. The presence of water and/or hydrocarbons indicates that the formation is porous.

In similar fashion, a gamma ray density sensor includes a chemical source that generates gamma radiation that is focused into the formation. Gamma rays or photons emitted from the source enter the formation to be studied, and interact with the atomic electrons of the material of the formation by photoelectric absorption, by Compton scattering, or by pair production. In photoelectric absorption and pair production phenomena, the particular photons involved in the interaction are removed from the gamma ray beam. In the Compton scattering process, the involved photon loses some of its energy while changing its original direction of travel, the loss being a function of the scattering angle. Some of the photons emitted from the source into the sample are accordingly scattered toward the near receiver and far receiver. Many of the photons never reach the receivers, because their direction is changed by a second Compton scattering, or they are absorbed by the photoelectric absorption process or the pair production process. The scattered photons that reach the receivers and interact with it are counted by the electronic equipment associated with the receiver. The number of gamma rays measured and the energy level of the gamma rays is a function of the density of electrons in the formation, which is approximately proportional to the density of the formation. Examples of prior art wireline density devices may be found in U.S. Pat. Nos. 3,202,822, 3,321,625, 3,846,631, 3,858,037, 3,864,569, and 4,628,202.

While wireline logging is useful in assimilating information relating to formations downhole, it nonetheless has certain disadvantages. For example, before the wireline logging tool can be run in the wellbore, the drill string must first be removed or tripped from the borehole, resulting in considerable cost and loss of drilling time for the driller (who typically is paying daily fees for the rental of drilling equipment). In addition, because wireline tools are unable to collect data during the actual drilling operation, drillers must make some decisions (such as the direction to drill, etc.) without sufficient information, or else incur the cost of tripping the drill string to run a logging tool to gather more information relating to conditions downhole.

More recently, there has been an increasing emphasis on the collection of data during the drilling process. By collecting and processing data during the drilling process, without the necessity of tripping the drilling assembly to insert a wireline logging tool, the driller can make accurate modifications or corrections, as necessary, to optimize performance. Designs for measuring conditions downhole and the movement and location of the drilling assembly, contemporaneously with the drilling of the well, have come to be known as "measurement-while-drilling" techniques, or "MWD." Similar techniques, concentrating more on the measurement of formation parameters, commonly have been referred to as "logging while drilling" techniques, or "LWD." While distinctions between MWD and LWD may exist, the terms MWD and LWD often are used interchangeably. For the purposes of this disclosure, the term LWD will be used with the understanding that the term encompasses both the collection of formation parameters and the collection of information relating to the movement and position of the drilling assembly.

The measurement of formation properties during drilling of the well by LWD systems increases the timeliness of measurement data and, consequently, increases the efficiency of drilling operations. Nuclear measurements, such as neutron porosity and gamma-gamma density, commonly are use to provide formation data that is basic to characterizing formation properties. See "State of the Art in MWD," International MWD Society (Jan. 19, 1993). The accuracy of nuclear measurements, however, is limited in LWD systems due to displacement of the source and receiver from the borehole wall. Because the distance that the nuclear source and detectors are displaced from the borehole wall varies during drilling, the usefulness of nuclear based measurement devices is limited in LWD applications. The distance that the source and detectors are displaced from the borehole wall is commonly referred to as "standoff," and the size of the standoff directly affects the measurements made by the nuclear detectors.

In wireline applications, displacement devices are used which force the sonde against the borehole wall to provide a constant standoff distance that thereby insures the integrity of the results achieved by the nuclear sensors. See U.S. Pat. Nos. 3,023,507 and 4,047,027. In LWD systems, however, forced displacement is not a viable option, although in some instances full gauge stabilizers have been used to increase the accuracy of the nuclear based measurement. Full gauge stabilization systems have included arrangements to permit detectors to be mounted in the fins of stabilizers to minimize standoff distance and to eliminate the effects of drilling fluids on the measurements. See U.S. Pat. Nos. 5,250,806 and 4,879,463. Full gauge stabilization, however, is impractical in many conventional drilling applications, particularly when the bottomhole assembly is steered according to the techniques disclosed in commonly assigned U.S. Pat. No. 4,667,751. Unaccounted for motion of an LWD tool implementing nuclear based measurement systems results in a measurement response which is, at best, an average, with varying amounts of drilling fluid present between the formation and the sensors for each measurement, resulting in measurements with poor sensitivity to the formation properties.

Nuclear measurements employ the statistical analysis of nuclear responses or counts measured by the detectors, as well as the energy level measured by the detector. Because data taken with the LWD tool positioned closer to the borehole wall represents the properties of the formation more accurately than measurements taken further from the borehole wall, knowledge of the distance or standoff of the logging tool from the borehole wall has been used to process the data from the nuclear sensors for relative accuracy. See U.S. Pat. Nos. 5,091,644, 5,175,429. Typically, the logging tool continuously rotates during drilling, causing the standoff sensors to change position as the wellbore is drilled. As a result, the determination of standoff distance must be determined continuously and rapidly.

In order to correlate the standoff distance with nuclear detector data, the prior systems have used a system in which nuclear count and energy data is stored in memory by bin locations. See, e.g., U.S. Pat. No. 5,175,429. The data is sorted into a plurality of memory bins based upon a standoff distance for the sensors that is measured contemporaneously with the measurement of the nuclear count data by the nuclear receivers. The bins are predetermined by preset threshold standoff values, so that nuclear count and energy data is stored in a respective bin defined by the associated standoff distance. Thus, for example, in a four bin system, bin 1 could be used to store all count data where a standoff was found between the borehole wall and the sensor of 0–0.25 inches; bin 2 could be used to store all data where a standoff was measured between 0.25–0.50 inches; bin 3 could be used to store all data for a standoff of 0.50–1.00 inches; and bin 4 would be used to store data for a standoff greater than 1.00 inch. As shown in FIG. 6, the segregation of data in this manner permits the weighting of the data when it is ultimately retrieved at the surface of the well (normally when the drill string is pulled to replace or change drilling components). When the data is retrieved at the surface, the data in each bin is assigned a particular weight factor, so that data compiled while the sensor is closest to the borehole wall is assigned the greatest weight, and data taken when the sensor is farthest from the borehole wall is assigned the least weight. The weight factor then is multiplied by each of the count values in that bin. Thus, as shown for example in the prior art technique of FIG. 6, bin 1 is assigned a weight factor of 1 (which is multiplied by all count data values in bin 1), bin 2 is given a weight factor of 0.50 (which is multiplied by all count data values in bin 2), bin 3 is given a count value of 0.25 (which is multiplied by all count data values in bin 3), and bin 4 is assigned a count value of 0.10 (which is multiplied by all count data values in bin 4).

The use of the memory binning technique has enabled the driller to process the nuclear measurements in a more meaningful fashion once the tool is retrieved from the borehole. The binning technique is not, however, without limitations. The first limitation is that additional memory must be included in the system to provide adequate storage space in each of the plurality of bins, in the event that a majority of the data is stored in that particular bin. Consequently, in a four bin system, for example, the downhole memory required may be four times larger than that required if no binning is used. Secondly, the use of memory bins provides a fairly insensitive weighting factor to the nuclear data, which only can be improved by adding more memory bins. In the example given above, the same weight factor would be applied to all count data whether the logging tool is abutting the borehole wall or is 0.25 inches away, because data in that range would be stored in the same memory bin (bin #1). Moreover, in the above example with four bins, if the standoff distance was 0.24 inches, a weight factor of 1 would be used for the associated count data, while measurements occurring with a standoff distance of 0.26 inches would only be assigned a weight factor of 0.50. Such an anomaly in the weight factor function only serves to distort the accuracy of the count data. Moreover, unless a large number of memory bins were provided, which is not practical, the weight factor function will not exhibit a smooth response curve.

In addition, the nuclear data is relatively meaningless until it is appropriately weighted by the standoff distance, which typically does not occur until the data is downloaded from the memory bins at the surface. There is no mechanism in the prior art systems for processing the standoff distance and nuclear data downhole to give a weighted value that can be transmitted to the surface through mud pulses, or which can be used downhole by a downhole controller to make decisions on the fly. As a result, the driller must wait for data to be retrieved and processed at the surface after the data is downloaded from the memory bins.

SUMMARY OF THE INVENTION

The present invention solves the shortcomings and deficiencies of the prior art by implementing a standoff compensation system with a downhole processor that measures standoff distance and which instantly determines a particular weight value for the associated nuclear count data. In addition, the present invention determines a single weighted count average $C_W$ over a given period of time n, which then can be stored in memory downhole and/or transmitted to the surface via conventional telemetry procedures (such as mud pulse signals, mud siren signals, electromagnetic signals, or the like). Because a single weighted count value is computed downhole for a predetermined period of time, there is no need to provide separate memory bins, and thus the size of memory required can be reduced significantly or can be reallocated for other operations. In addition, because the weight values are determined by a processor downhole, a greater degree of precision can be provided than is possible with the weighted binning system. Complex relationships between weight value and standoff distance can be implemented and either calculated downhole, or stored in a look-up table in memory. As a result, instead of weighting the count data in one of x ways (where x equals the number of memory bins), as is done in the prior art binning systems, the data can be more precisely weighted, in accordance with the present invention, in one of $2^y$ ways (where y equals the number of bits of data that can be processed simultaneously by the processor). The preferred embodiment of the present invention requires a microprocessor with at least an eight bit data width to provide at least 255 different possible weight values for the count data, based upon the measured standoff value. Moreover, the average weighted count values $\overline{C}_W$ (for each averaging period n) can be quickly retrieved when the logging tool is brought to the surface, minimizing processing time at the surface.

The present invention includes an acoustical transducer positioned near the nuclear source(s) for transmitting and receiving acoustical signals to determine the distance between the LWD drill collar and the borehole wall. The acoustic transducer preferably comprises a piezoelectric crystal that is mounted in a recessed housing in the logging tool. The transducer, which preferably is aligned axially with the nuclear detectors, is actuated by applying a voltage signal across the crystal, causing it to vibrate and generate the acoustic wave. Some of the wave is reflected off of the borehole wall, where it is received by the crystal and converted to an electrical signal. The processor controls the timing of the voltage signal applied to the crystal, and also determines an index element value based on the time-of-flight of the acoustic wave.

The processor then uses the index element value to determine a weight factor. The weight factor can be calculated according to a predetermined relationship between weight and standoff distance, or the weight factor can be derived by reference to a look-up table that has been preprogrammed to reflect the desired relationship between weight factor and standoff distance. The weight factor is multiplied by the count data that is measured contemporaneously by the density or porosity receiver, and this weighted value is sent to an accumulator which adds all such weighted values derived during a measuring interval. The total average weighted count value $\overline{C}_W$ then is stored for that period with certain other data indicating the position where the data was measured and the time when the measurement was made.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENT

Figure 1:
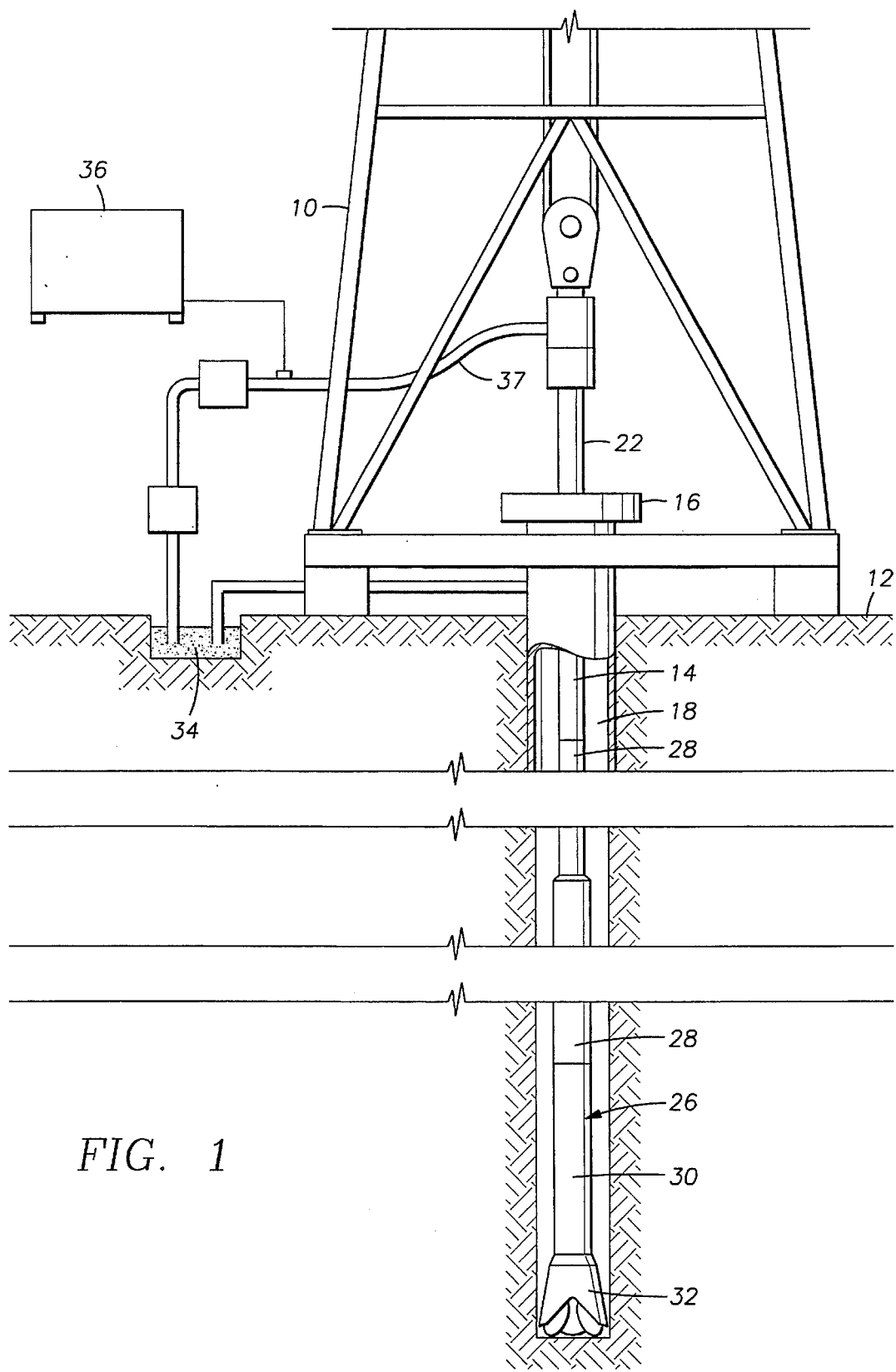
FIG. 1 is a schematic elevation of a drilling assembly implementing a LWD system in accordance with the present invention.

Referring now to FIG. 1, a typical drilling installation is illustrated which includes a drilling rig 10, constructed at the surface 12 of the well, supporting a drill string 14. The drill string 14 penetrates through a rotary table 16 and into a borehole 18 that is being drilled through earth formations 20. The drill string 14 includes a kelly 22 at its upper end, drill pipe 24 coupled to the kelly 22, and a bottom hole assembly 26 (commonly referred to as a "BHA") coupled to the lower end of the drill pipe 24. The BHA 26 typically includes drill collars 28, a LWD tool 30, and a drill bit 32 for penetrating through earth formations to create the borehole 18. In operation, the kelly 22, the drill pipe 24 and the BHA 26 are rotated by the rotary table 16. The drill collars are used, in accordance with conventional techniques, to add weight to the drill bit 32 and to stiffen the BHA 26, thereby enabling the BHA 26 to transmit weight to the drill bit 32 without buckling. The weight applied through the drill collars to the bit 32 permits the drill bit to crush and remove cuttings from underground formations.

As the drill bit 32 operates, drilling fluid or mud is pumped from a mud pit 34 at the surface through the kelly hose 37, into the drill pipe, to the drill bit 32. After flowing through the drill bit 32, the drilling fluid rises back to the surface through the annular area between the drill pipe 24 and the borehole 18, where it is collected and returned to the mud pit 34 for filtering. The drilling fluid is used to lubricate the drill bit 32 and to remove cuttings from the borehole 18. As one skilled in the art will realize, a downhole motor or turbine may be used downhole to rotate the drill bit 32 as an alternative, or in addition to, rotating the drill string from the surface.

The LWD tool 30 preferably is located as close to the bit 32 as practical. It should be understand that the tool 30 may be considered part of the drill collar section 28. Signals representing measurements of borehole dimensions and drilling parameters are generated and stored in the LWD tool 30, as will be described more fully below. In addition, some or all of the signals also may be routed through a communication assembly in the drill string 14 to a control unit 36 at the earth's surface 12, where the signals are processed and analyzed. The communication of the signals from the LWD tool 30 to the control unit 36 preferably is accomplished through the use of known telemetry systems, and therefore will not be discussed in detail herein.

Figure 2:
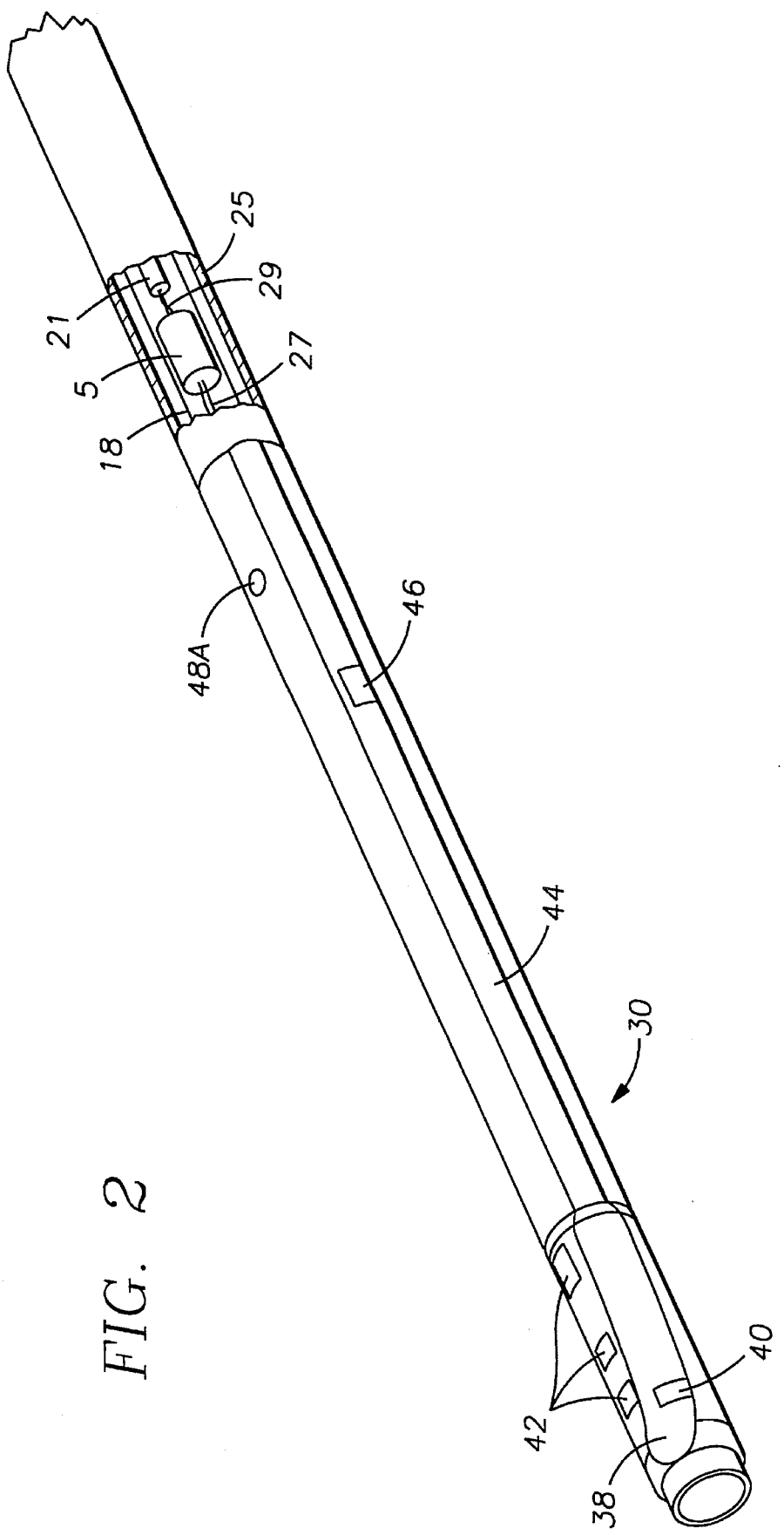
FIG. 2 is a perspective view of a LWD tool implementing an acoustic standoff compensation system in accordance with the preferred embodiment.
Figure 3:
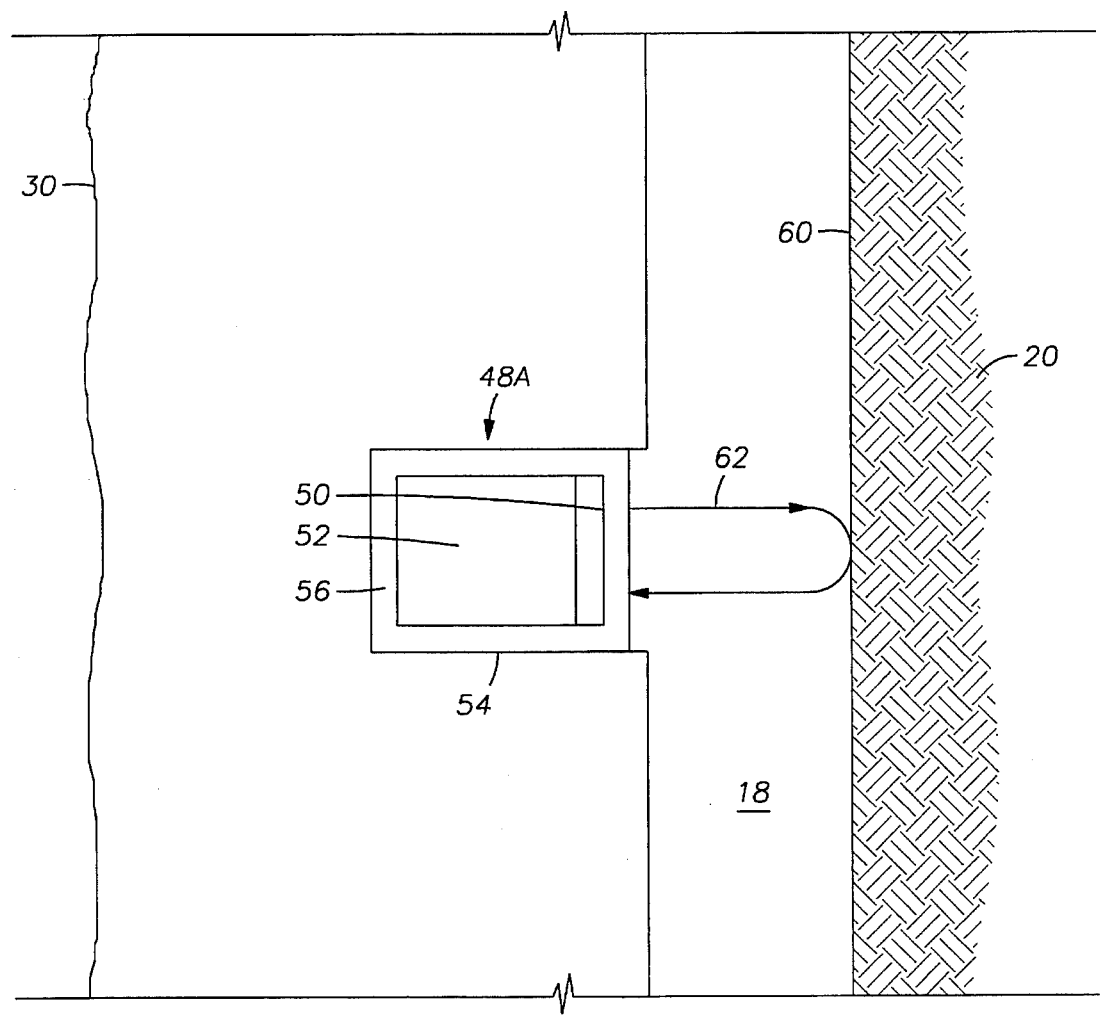
FIGS. 3 is a sectional view of the acoustic transducer, depicting the path of the ultrasonic signal emanating from the transducer.
Figure 3:
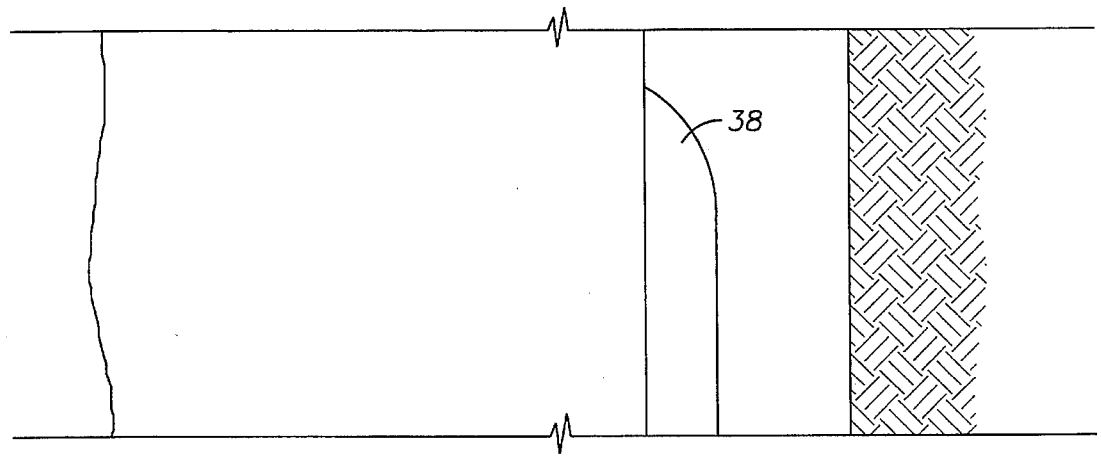

Referring now to FIGS. 2 and 3, the logging tool 30 constructed in accordance with the preferred embodiment generally forms part of the drill pipe 24 during operation, and may advantageously include a number of detecting and sensing devices. As best shown in FIG. 2, the LWD tool 30 preferably includes a sleeve 38 covering a density device, such as a gamma ray density device. The density device generally includes a source 40 and windows 42 for emitting and receiving energy for density measurements according to conventional techniques. The body of the LWD tool 30 also preferably comprises a mandrel 44 housing a neutron device 46 for obtaining porosity measurements in accordance with normal convention. In the preferred embodiment of the present invention, the density measurements are subdivided into discrete energy windows representative of particular parameters. Thus, according to the preferred embodiment, the measurements for density and porosity are evaluated with respect to the count levels detected and the energy at which the counts are received. This evaluation preferably is catagorized by energy level into several windows of information that reflect density, lithology, peak and other values. In the preferred embodiment, the standoff data is used to instantly weight the value of the count data in each of the discrete energy windows.

In accordance with the preferred embodiment of the present invention, the LWD tool 30 also preferably includes a sensor 48A for determining standoff distance between the logging tool and the borehole wall. In accordance with the preferred embodiment of the present invention, three such sensors 48A, 48B and 48C (FIG. 4A) are provided and are spaced circumferentially around the tool 30. These sensors preferably comprise acoustic transducers that are spaced equidistantly around the circumference of tool 30. As described in J. R. Birchak, et al. "Standoff and Caliper Measurements While Drilling Using a New Formation-Evaluation Tool with Three Ultrasonic Transducers", presented at the 68th Annual Technical Conference and Exhibition of the Society of Petroleum Engineers held in Houston, Tex. on October 3–6, 1993, the teachings of which are incorporated by reference herein, these three transducers 48A, 48B and 48C are used as past of an apparatus and method for measuring the caliper and configuration of the borehole. It should be understood, however, that the present invention can be implemented with only a single acoustic transducer 48A. Additional transducers are required only if the present invention is also to be combined with a caliper and borehole measurement system.

The transducer 48A, in accordance with the present invention, preferably is axially aligned with the density and neutron receivers to provide standoff distances for providing a weighting factor to the density and porosity calculations. As shown in FIGS. 2 and 3, the sensor or transducer 48A is preferably partially housed in the drill collar 30. The transducer 48A preferably includes a piezoelectric crystal 50 and a tungsten alloy backing 52, which preferably attaches to the interior surface of crystal 50. The crystal and backing preferably are encapsulated in epoxy 56 to form transducer 48A, which preferably mounts within a recess 54 machined in the tool 30. As best seen in FIG. 3, when positioned in the borehole 18, the transducer 48A is slightly recessed with respect to the tool periphery 58, facing the borehole wall 60. The space between the tool periphery 58 and the borehole wall 60 represents the tool standoff at the depth and angular position where the transducer 48A is located at that instant in time. Normally, this space between the tool 30 and borehole wall 60 is filled with a pressurized flow of drilling fluid during drilling.

In operation, the piezoelectric crystal 50 preferably generates ultrasonic signals 62 in response to an electrical pulse from a voltage sensor, such as a battery 21 (FIG. 2) in the preferred embodiment. This signal 62 travels through the drilling fluid surrounding the tool 30 and is reflected by the borehole wall 60. At least a portion of the ultrasonic signal 62 rebounds from the borehole wall 60 and is received by the piezoelectric crystal 50, which in turn converts the signal received into an electrical pulse. The arrival time of the signal thus received is recorded and a "time-of-flight" signal is generated by electronic circuitry, as described more fully below. The time-of-flight signal preferably is used to determine the standoff distance between the transducer 48A and the borehole wall 60.

The acoustic impedance of the epoxy layer 56 preferably is selected to optimize the transfer of acoustic energy into the mud. Also, the impedance of the backing 52 preferably is selected to match the impedance of the crystal 50, and functions to absorb the portion of the wave emitted from the back of the crystal 50. The backing also dampens the ringing that would otherwise persist in the crystal after transmission of the acoustic signal. To function properly, the damping must occur before the reflected waves are received by the crystal 50.

Figure 4A:
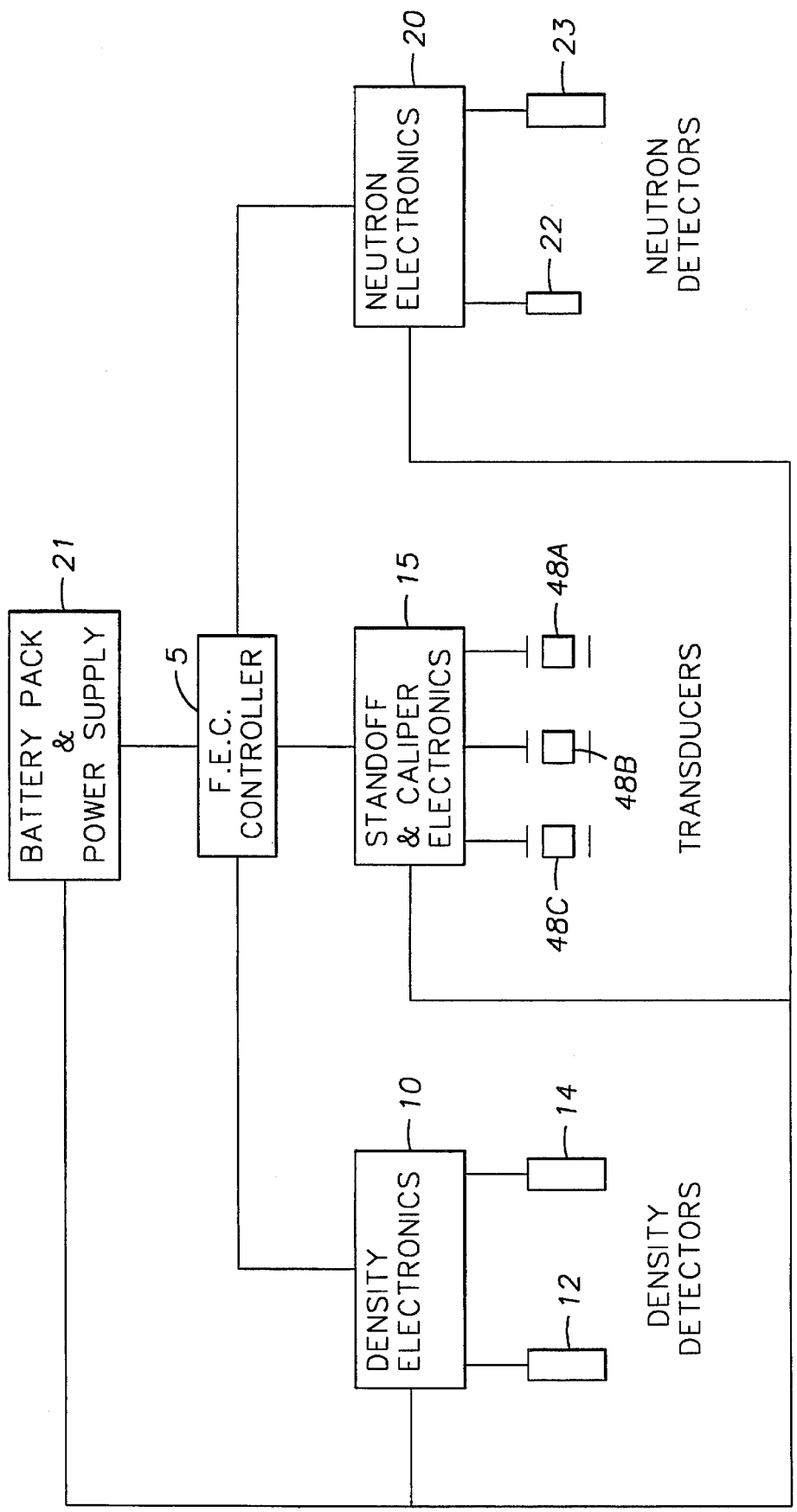
FIG. 4A is a block diagram of the system layout of the present invention in accordance with the preferred embodiment.

Referring now to FIG. 4A, the LWD tool, in accordance with the preferred embodiment, generally includes a battery pack and power supply unit 21, a formation evaluation controller 5, density electronics 10 connected to the density detectors 12, 14, neutron electronics 20 connected to neutron detectors 22, 23 and standoff and caliper electronics 15, connected to three transducers 48A, 48B and 48C.

The battery pack 21 provides operating power to each of the electronic subassemblies in accordance with conventional techniques. The formation evaluation controller 5 preferably comprises a central processing unit 64 and a data memory 92, as will be discussed more fully with respect to FIG. 4B. The formation evaluation controller 5, in accordance with the preferred embodiment, receives output signals from the density electronics 10, the neutron electronics 20, and the standoff electronics 15 to compute weighted density and weighted neutron count data based upon the measured standoff distance.

The density electronics 10 is constructed in accordance with conventional techniques and preferably includes two detectors 12, 14. The density electronics 10 develops count data representative of gamma density based upon the output of detectors 12, 14. Similarly, the neutron electronics 20 is constructed in accordance with conventional techniques and includes neutron detectors 22, 23 for developing count data representative of neutron porosity. The standoff and caliper electronics 15 will be discussed more fully with respect to FIG. 4B.

Figure 4B:
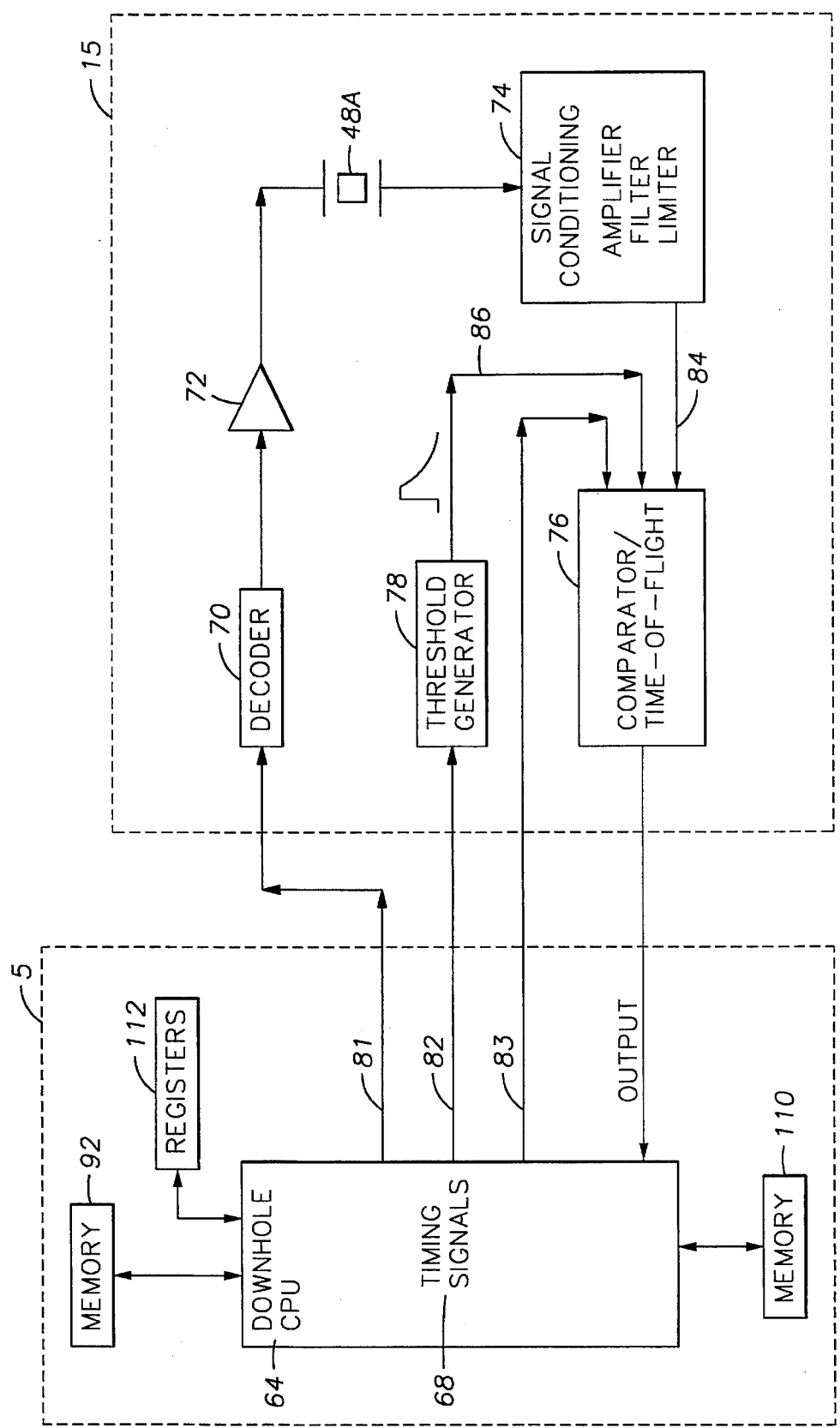
FIG. 4B is a block diagram for the electronic circuitry of the controller and standoff transducer of FIG. 4A.

Referring now to FIGS. 2 and 4B, a block diagram of the electronic circuitry associated with the transducer 48A and formation evaluation controller 5 is shown in accordance with the preferred embodiment. As shown in FIG. 2, the electronic circuitry preferably is located in a sub 25 positioned adjacent drill collar 30. The electronic circuitry preferably is mounted within a pressure barrel 18 to prevent contamination, and connects to the logging sensors and transducer 48A through a conductor bundle 27. As shown in FIG. 2, the electronic circuitry preferably is powered by a battery pack 21, to which it is connected by conductors 29.

Referring still to FIG. 4B, the formation evaluation controller 5 and standoff electronics 15 preferably comprise a downhole processing unit 64 (referred to herein as "CPU," "processing unit" or "processor"), a transducer decoder 70, a threshold generator 78, a comparator 76, and data memory 92. The downhole processing unit 64 preferably is programmed in accordance with conventional techniques to generate an acoustic measurement of standoff distance every 20 milliseconds. As one skilled in the art will understand, the measurements can be taken more or less frequently as desired. The processor 64 generates three timing signals that are transmitted to the transducer decoder 70, the threshold generator 78 and the comparator 76. Upon receipt of the first timing signal from the central processing unit 64 on conductor 81, the transducer decoder 70 initiates the voltage pulse that is amplified by amplifier 72 and is transmitted to the transducer 48A, causing it to fire. The transducer decoder 70 determines the magnitude and the width of the voltage pulse that is sent to the transducer 48A. The pulse causes the transducer to fire, producing an acoustic wave that is transmitted radially from the logging tool 30. Acoustic signals reflected by the borehole wall 60 are received by the transducer 48A, which generates an electrical output signal that is amplified and filtered by signal conditioning circuitry 74. The conditioned output signals are applied on conductor 84 to the comparator 76. The second timing signal on line 82 is received by the threshold detector 78, and is used by the threshold detector 78 to determine the length of the wait period between the firing of the transducer 48A and the time at which reflected pulses can be accepted. The wait period is required to prevent false signals that would otherwise result from the ringing of the crystal. The third timing pulse is transmitted via conductor 83 to the comparator 76 and is used to start the time-of-flight measurement and limit its output range.

Figure 5:
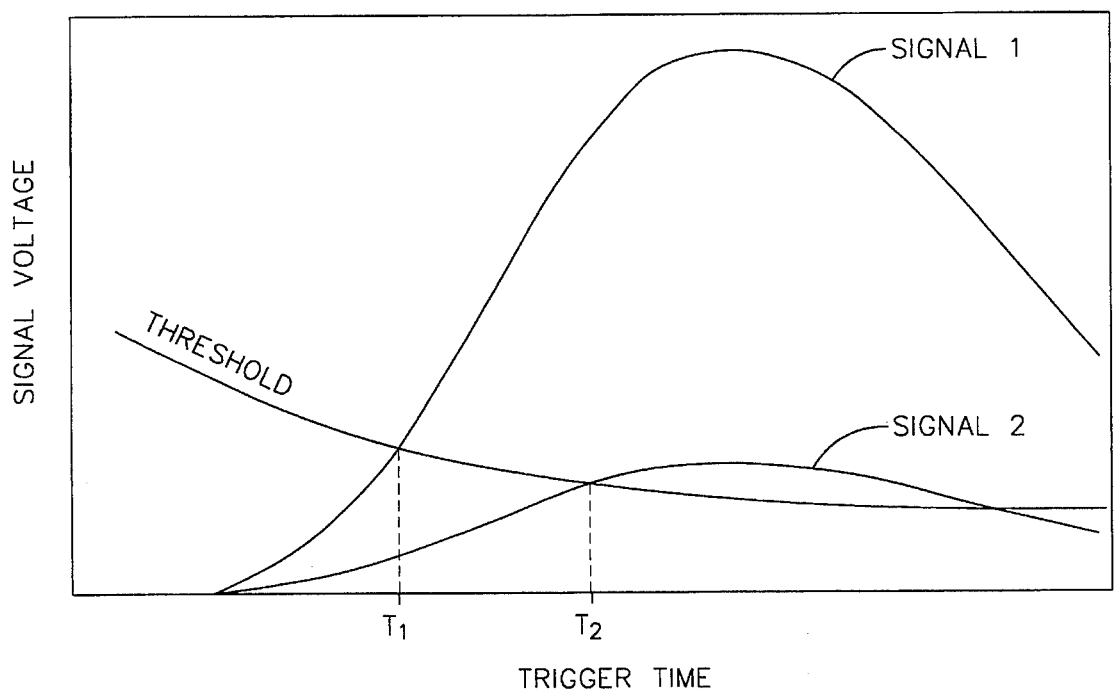
FIG. 5 is a graph illustrating the variation in the threshold triggering voltage with time, for the threshold generator of FIG. 4B.

After the wait period has expired, the amplitude of the reflected pulses are compared in the comparator 76 with an electronic threshold established by the threshold generator 78 on conductor 86. Because the amplitude of the ultrasonic waves decrease with the distance travelled, and thus the time travelled, the threshold preferably decays exponentially with time, as shown for example in FIG. 5. This decaying of the threshold value provides the same sensitivity to all waves, regardless of the distance that the wave has travelled. If the received signal is greater than the threshold value, the comparator 76 calculates a time-of-flight value by counting the period between the time that a signal is received on line 83 from the processing unit, and the time that a signal is received from the transducer on line 84. An electrical signal indicative of the time-of-flight value preferably is transmitted to the central processing unit 64 on conductor 85, and is used by the CPU 64 to compute a weight factor for the neutron and density count data.

A memory unit 92 preferably is provided in the formation evaluation controller 5 that includes at least a one Mbyte storage capacity. The memory unit 92 stores measured and processed data for retrieval subsequently. In addition, a read only memory 110 ("ROM") preferably also is included in the formation evaluation controller 5 for storing certain basic input operating instructions for the CPU in accordance with conventional techniques. The ROM 110 may also be used in an alternative embodiment to store weight function values in a look-up table. Status and control registers 112 also preferably are provided in accordance with conventional techniques to store control and status information for the formation controller.

The standoff distance S of transducer 48A may be determined according to the following formula:

$$S = \frac{v(t - t_0)}{2} - d \quad (1)$$

where

S is the standoff distance between the transducer 48A and the borehole wall 60;

v is the speed of sound (or acoustic velocity) in the drilling fluid;

d is the distance that the transducer is recessed in the mandrel of the logging tool 30;

t is the time-of-flight measured for the acoustic wave; and $t_0$ is the offset time reflecting the electronic delays of the circuitry and the time required for the acoustic wave to travel through the encapsulating epoxy.

The acoustic velocity v in the drilling fluid under actual conditions downhole can be measured dynamically according to certain known techniques. In the preferred embodiment, however, a value is assigned to the acoustic velocity v based on the borehole conditions, including the type of drilling fluid (water-based or oil-based), fluid weight, fluid salinity, temperature and pressure, all of which are known during a drilling operation. The manner of estimating the speed of sound in the drilling fluid can be accomplished by assembling equations for the known parameters to provide a reasonably accurate approximation. See generally M. Greenspan, et al. "Tables of the Speed of Sound in Water," *J. Acoust. Soc. Am.*, Vol. 31, NO. 1 (January 1959); C. C. Leroy, "Development of Simple Equations for Accurate and More Realistic Calculation of the Speed of Sound in Sea Water," *J. Acoust. Soc. Am.*, Vol. 46 (1969); A. L. Podio, et al. "Ultrasonic Velocity and Attenuation Measurements in Water-Based Drilling Muds," ASME Drilling Technology Symposium, PD Vol. 27 (January 14–18, 1990). It has been determined that approximating a value for the acoustic velocity v based on these parameters is sufficiently precise for the purposes of the present invention. The offset time $t_0$ is determined in a tool calibration procedure conducted in accordance with conventional techniques prior to the use of the logging tool 30.

The standoff distance S(t) preferably is measured once for each sampling interval t, which preferably is at least every 20 milliseconds, so that a measurement is made 50 times a second. Thus, if the logging tool 30 is rotating at 60 RPM and measurements are taken every 20 millisecond, 50 measurements are made of the standoff distance in one rotation.

The standoff distance typically is averaged over a specified time interval or averaging period n to determine standoff for calculations. The averaging period n usually ranges from 1 to 60 seconds. In accordance with the preferred embodiment, the averaging period n is 20 seconds, to provide 1000 measurements for a sampling interval t of 20 milliseconds. As one skilled in the art will understand, measurements can be taken more or less often as desired, or shorter or longer averaging periods can be used, without departing from the principles of the present invention.

Once the standoff distance S(t) has been measured for a particular sampling interval t, a weight factor W preferably is determined by the central processing unit 64, based upon the standoff distance S. Thus, the weight factor W is a function of the standoff distance S for a particular time period, and may be designated mathematically as W(S(t)). The weight factor is multiplied by the count data C(t) for the time period t, (C(t)×W(S(t))), to determine a weighted count value $C_W$. This calculation preferably is performed for each of the discrete energy windows of the nuclear measurement data.

In accordance with the preferred embodiment, a single average weighted count value $\overline{C}_W$ then is determined over each averaging period for each discrete energy window, according to the following ideal equation:

$$\overline{C}_w = \frac{\int C(t)W(S(t))dt}{\int W(S(t))dt} \quad (2)$$

The numerator of Equation (2) is the weighted count value $C_W$ for a particular sampling period t, integrated over a fixed averaging period n (for example, 20 seconds). The denominator of Equation (2) is the weight value W, that has been determined for each time period t, integrated over the averaging period n. integrated weight value provides a normalizing function for the equation.

Because the transducer does not make continuous measurements, but instead makes discrete measurements very frequently, the integral of Equation (2) must be replaced with summations of these discrete measurements, as follows:

$$\overline{C}_w = \frac{\sum_{i=1}^{N} C_i W_i}{\sum_{i=1}^{N} W_i} \quad (3)$$

According to Equation (3), the weighted count value for a particular averaging period $\overline{C}_W$ is obtained by summing the discrete values measured by the transducer and nuclear receivers for all values during the averaging period n. If the averaging period n is 20 seconds and the sampling interval t is every 20 milliseconds, the number of measurements N in the averaging period n will be 1000. Thus, in this example, the summations in the numerator and denominator of Equation (3) would run from i=1 to 1000.

In Equation (3), $C_i$ is the count rate measured during the interval i, $W_i$ is the weight factor determined based upon the standoff measured during interval i, and N is the number of intervals in the averaging period. Because the sampling interval t is very short (10–20 msec) compared to the rotational period of the drill string (typically 1 second per rotation), Equation (3) is an excellent approximation of Equation (2).

Figure 6:
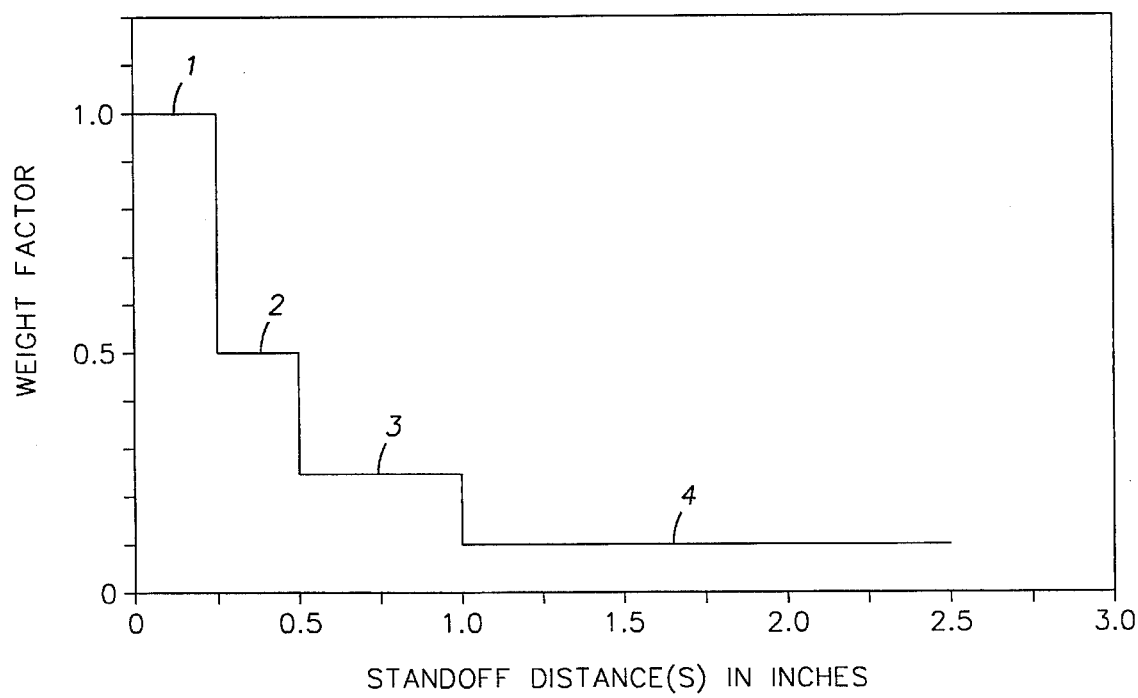
FIG. 6 is a graph illustrating the manner in which weighting factors are determined in prior art memory binning standoff compensation schemes.
Figure 8A:
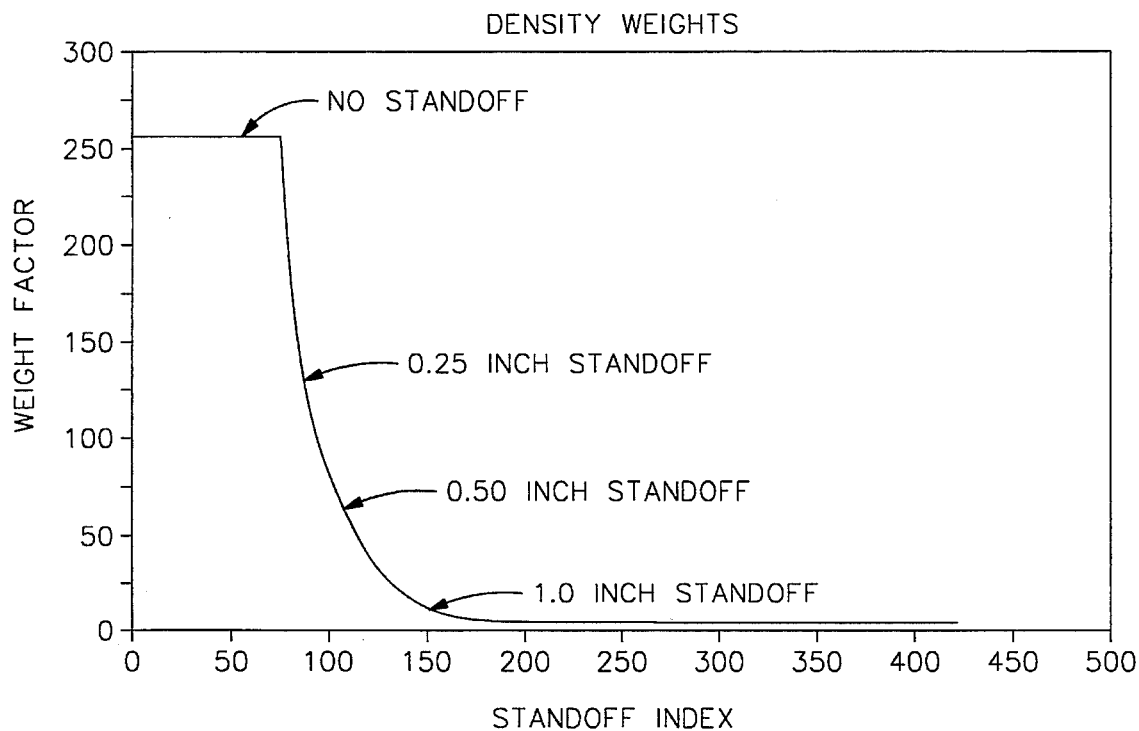
FIGS. 8A–8B are charts illustrating weight factor relationships for gamma density and neutron porosity calculations.
Figure 8B:
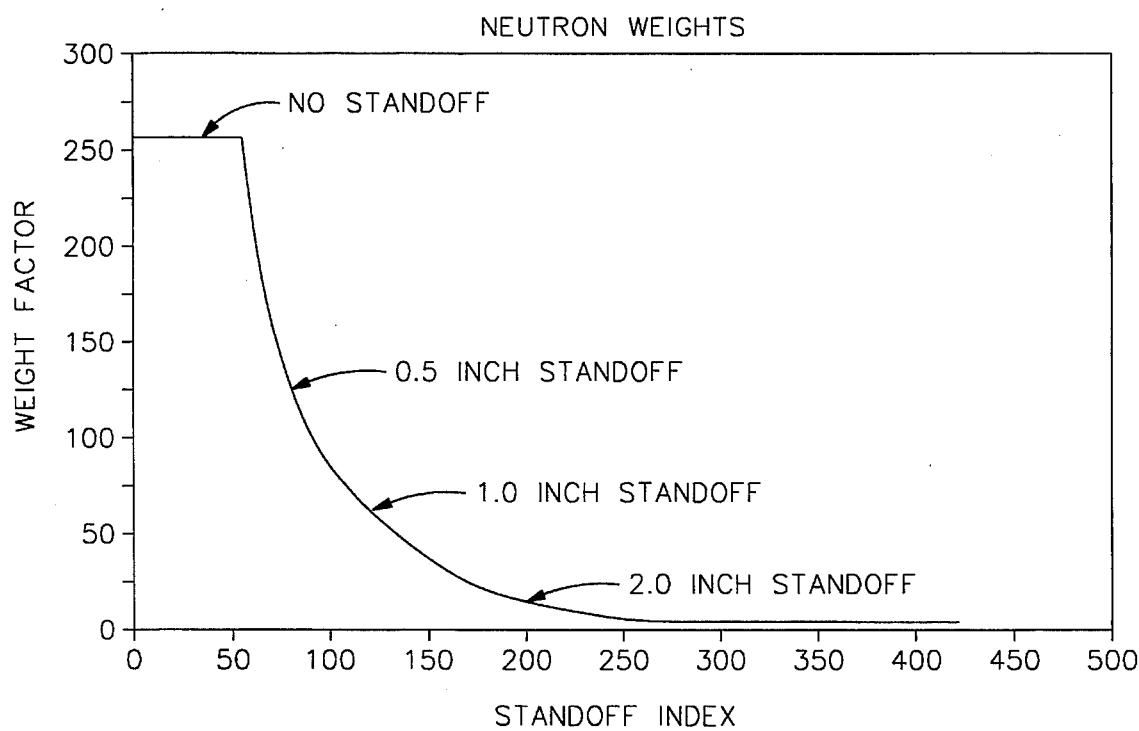

Referring now to FIGS. 8A and 8B, the relationship of weight factor W to standoff distance S is shown in accordance with the preferred embodiment of the present invention. This weight/standoff relationship should be compared to that which results from the use of memory binning, as shown in FIG. 6. The use of the continuous weighting function is much more precise than can be obtained using discrete memory bins.

Figure 7:
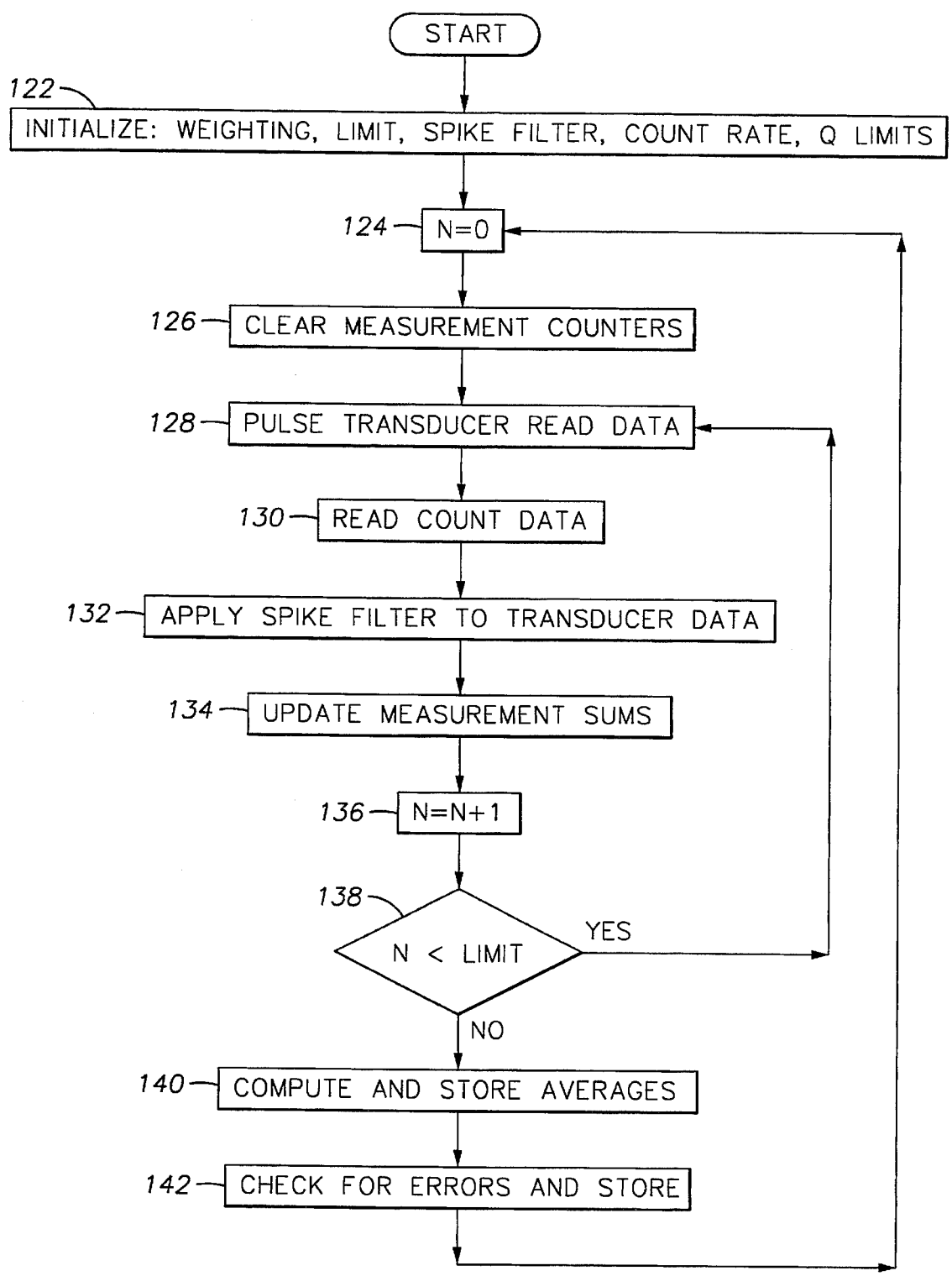
FIG. 7 is a flow chart illustrating operation of the central processing unit of the present invention.

The operation of the central processor and the determination of weight values will now be described with reference to FIGS. 7, 8A and 8B. Referring first to FIG. 7, the central processing unit 64 (in FIG. 4) preferably is initialized when the logging tool turns on and continues to run until the tool turns off. In step 122, the processor preferably initializes the system by (1) developing and/or accessing the weighting arrays for the gamma density measurements and the neutron porosity measurements; (2) determining the limit factor, which is the number of intervals or cycles N in the averaging period; (3) setting the spike filter counters to zero; (4) determining the count rate limits; and (5) determining the Q limits for the gamma density tool.

In accordance with the preferred embodiment, the central processing unit determines a weighting factor for each of the discrete energy windows of both the near and far gamma density measurements and determines a weighting factor for the neutron porosity measurements. Preferably, the central processing unit comprises a processor at least as powerful as an INTEL® 80186EC, and is capable of supporting a 500 element array I for the standoff distance, with a weighting sensitivity of 255 elements. The index element array I is appropriately scaled by determining the maximum possible response for the output of the standoff electronics 15.

Referring now to FIGS. 8A and 8B, the density weights and porosity weights constructed in accordance with the preferred embodiment are shown. As can be seen in FIG. 8A, the density weight function preferably is constructed of five different independent segments to provide a relatively complex but nonetheless continuous weight function, according to the following source code:

(TABLE I)

| DENSITY WEIGHTING FACTOR |
|---|
| DO I = 1, 72 |
|    Density Wt(I) = 255 |
| END DO |
| DO I = 73, 103 |
|    Density Wt(I) = 2,656/(I - 62) |
| END DO |
| DO I = 104, 124 |
|    Density Wt(I) = 110,224/(I - 62)**2 |
| END DO |
| DO I = 125, 181 |
|    Density Wt(I) = 6,889,000/(I - 62)**3 |
| END DO |
| DO I = 182, 420 |
|    Density Wt(I) = 4 |
| END DO |

As noted, the index value I represents the index element value, while the symbol Density Wt(I) represents the density weight factor for a given element I. An analysis of FIG. 8A shows that a full weight value is provided for the first 72 elements of the element array I. This represents the fact that the transducer is recessed in the logging tool by a distance d. The above values are provided as representative of the preferred embodiment, but it should be understood by one skilled in the art that other weight functions may be developed without departing from the principles of the present invention. For example, another possible weight function could be $W = e^{-2S}$, where W represents the weight factor and S represents the standoff distance. Similarly, as can be seen in FIG. 8B, the porosity weight function also preferably is constructed of five different independent segments to the weight function, according to the following source code:

(TABLE II)

| POROSITY WEIGHTING FACTOR |
|---|
| DO I = 1, 52 |
|    Porosity Wt(I) = 255 |
| END DO |
| DO I = 53, 115 |
|    Porosity Wt(I) = 5,227/(I - 32) |
| END DO |
| DO I = 116, 157 |
|    Porosity Wt(I) = 436,500/(I - 32)**2 |
| END DO |

(TABLE II)-continued

POROSITY WEIGHTING FACTOR

```
DO I = 158, 271
    Porosity Wt(I) = 54,780,000/(I - 32)**3
END DO
DO I = 272, 420
    Porosity Wt(I) = 4
END DO
```

Once a standoff distance S is measured by the transducer, the central processing unit preferably scales the output of the standoff electronics 15 to obtain an index element I by setting I=INT(S/2). Thus, according to the preferred embodiment, if the standoff electronics 15 is capable of providing 1000 different possible output signals, the index element value I would be set to a maximum of 500. The processing unit then preferably uses the source code listed above to calculate the appropriate weight factor. Alternatively, the values for each standoff distance S (or index element value I) can be stored in a look-up table in read only memory (ROM) 110 (FIG. 4) together with a preassigned weight value, based upon the weight function relationship. As will be understood by one skilled in the art, the look-up table incorporates the weight function relationship into pre-calculated values that can then be accessed. Thus, instead of calculating the weight factor, ROM 110 is accessed by the central processing unit to look up the weight value. One skilled in the art will understand that any of the available types of ROM may be used in this invention.

After the weighting arrays are initialized, the limit factor or number of intervals N is determined. The limit factor N is determined by dividing the length of the averaging period n by the length of the sampling intervals t, as follows:

$$N = \frac{n}{t} \tag{4}$$

Thus, for example, if the length of the averaging period n is 20 seconds, and the length of the sampling interval t is 20 milliseconds, the limit factor N is equal to 1000. Consequently, the processor determines that it must perform 1000 cycles for the particular averaging period.

The central processor next initializes the spike filter counters by setting the Time-Out Counter, the Positive Spike Counter and the Negative Spike Counter to zero. After the spike filter counters are zeroed, count rate limits are set for the values received from the gamma density and neutron porosity receivers. If a detected value falls outside the count rate limits, an error message is generated and stored in status register 112. The preferred count rate limits preferably are retrieved from read only memory ROM, and placed in working memory of the CPU, during the operation of the logging tool to minimize access time in accordance with conventional techniques. The central processing unit then compares all count data from the receivers with the threshold values to determine if an error condition exists. Count rate limits preferably are provided for each of the discrete energy windows, and may be chosen based upon the characteristics of the logging tool, including the spacing between the nuclear source and receivers, the characteristics of the source and receivers and the size of the tool with respect to the borehole.

The thresholds selected preferably relate to the highest and lowest acceptable values measured by the near gamma density receiver, to provide discrete energy windows for count information detected at particular energy levels. In accordance with the preferred embodiment of this invention, the count function is divided into three different discrete windows based upon energy level of the data received. Thus, the count data limits for the near density receiver establishes the upper and lower limits for each of these three different discrete energy windows. Similarly, threshold values are set for the far density receiver. Again, in accordance with the preferred embodiment of this invention, the count/energy relationship is divided into three discrete windows to reflect certain formation characteristics or other information. Count rate limits are preferably established for each of the discrete energy windows for the far density receiver. In addition, according to the preferred embodiment, threshold values are provided for each neutron receiver. As noted above, a status register 112 (FIG. 4) is provided to indicate when the measured count data is outside the threshold values. In the preferred embodiment, a sixteen bit register is provided, with one bit designated for each of the threshold values.

After the Count Rate Limits are set, the central processing unit preferably sets the Q Limits. The Q Limits, in accordance with normal convention, are additional error checks for the density measurements. Preferably, the Q limits are calculated by first establishing a value for a variable x, which is determined by the length of the averaging period n, as follows:

$$x = \sqrt{n} \tag{5}$$

Once x is determined, Q Limits can be set for the density measurements, as follows:

Q Near Low=a/x
Q Near High=b/x
Q Far Low=c/x
Q Far High=d/x

As one skilled in the are will understand, the values a, b, c, and d preferably are constant values that are chosen based upon tool characteristics and are stored in ROM prior to the time that the logging tool is placed in the well.

Returning now to FIG. 7, after performing the foregoing initialization procedures, the processing unit next sets the interval counter to zero in step 124, and in step 126 clears the measurement counters, which are used to sum the count data in accordance with Equation (3). Referring still to FIG. 7, after the system is initialized and the interval counter and measurement counters are cleared, the central processing unit transmits an electrical timing signal to the acoustic transducer 48A, causing it to fire (step 128), in accordance with the foregoing description related to FIG. 4. The processor then receives from the transducer and its associated circuitry an electrical signal indicative of the transducer data, which preferably is a time-of-flight value for the ultrasonic pulse, from which the processor determines a weight factor. In step 130, the processor preferably reads the count rates from the gamma density electronics 10 and from the neutron porosity electronics 20.

In accordance with the preferred embodiment, the present invention may be constructed so that the central processing unit performs two readings in step 130, with the first set of data stored in a first memory register, and the second set of data stored in a second memory register. This construction limits the number of times that the central processing unit must receive count data from the receivers, which is desirable if the processor does not have the necessary operating speed. Thus, for example, if the sampling interval t is 20 msec, the processor would read two sets of data every 40 msec. Alternatively, if the processor has the requisite operating speed to handle the calculations, then the count data can be read once during each sampling interval (i.e., once every 20 msec in this example). The following description assumes that a processor will be used that has the operating speed to read the data once for each sampling interval. If the processor does not have enough operating speed, then steps (132–136) are repeated for the second set of data.

In step 132, a spike filter is applied to the ultrasonic signals to eliminate spurious signals that may otherwise result. In the preferred embodiment, a software filter is used for the spike filter, according to the flow chart shown in FIG. 9. The subroutine of FIG. 9 determines the maximum and minimum acceptable deviation from previous transducer data and modifies the data if outside this window. The spike filter preferably is also used in response to the measurements taken by transducers 48A, 48B and 48C for the caliper measurements. As a result, the methodology illustrated in FIG. 9 and described below also is applicable to filter the signals from the caliper transducers.

Figure 9A:
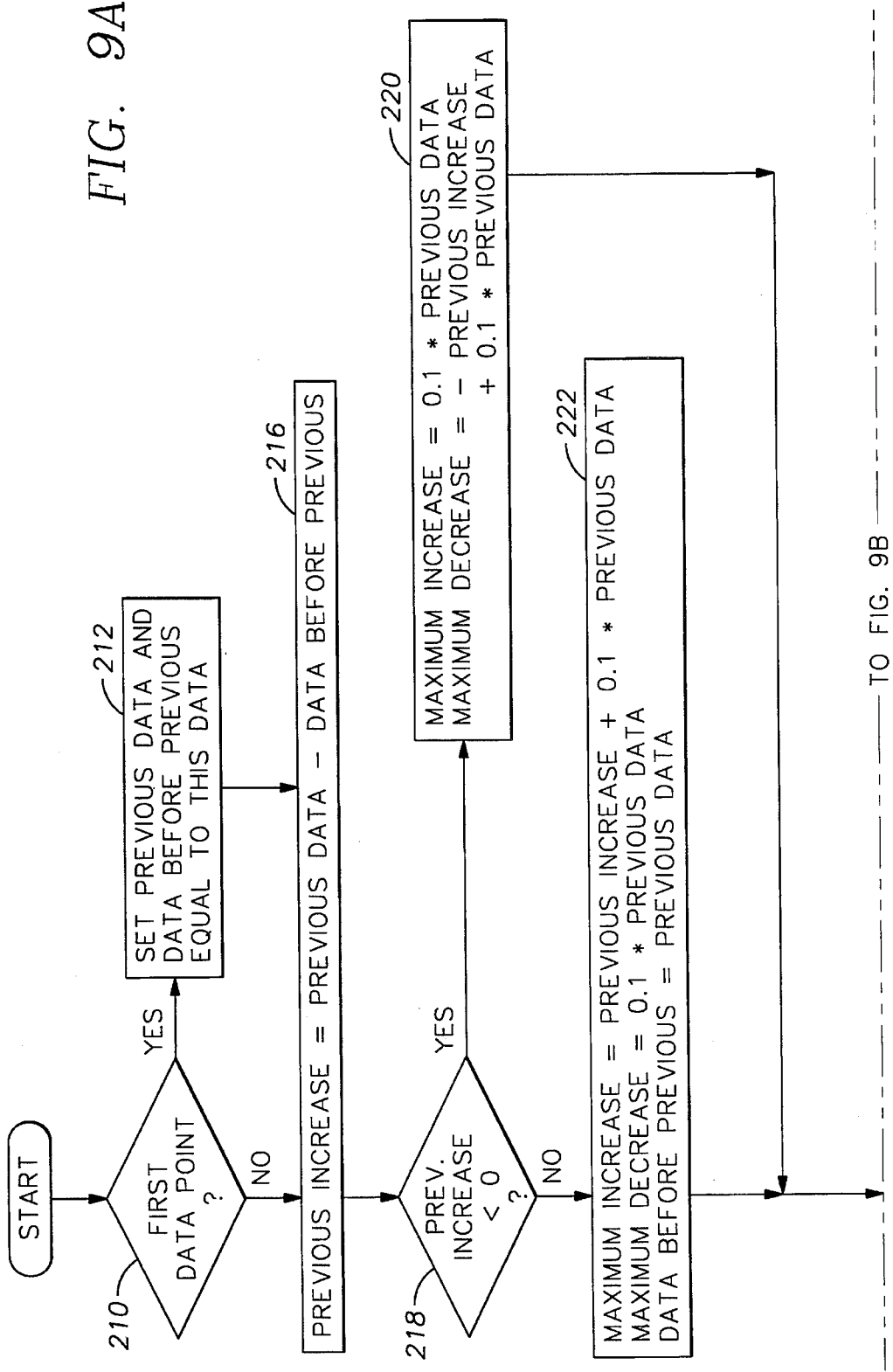
FIG. 9 is a flow chart illustrating the spike filter subroutine of FIG. 7.
Figure 9B:
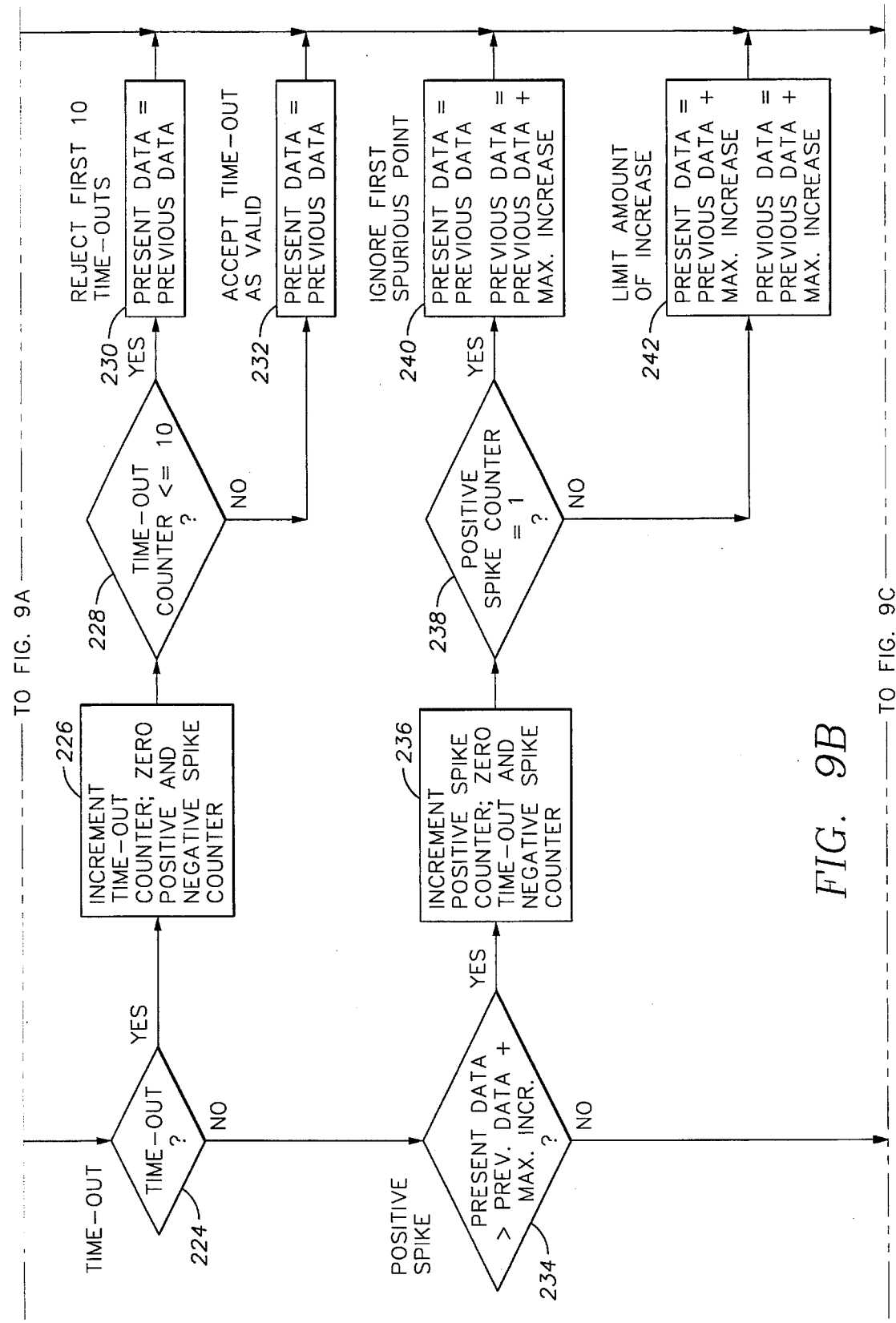
Figure 9C:
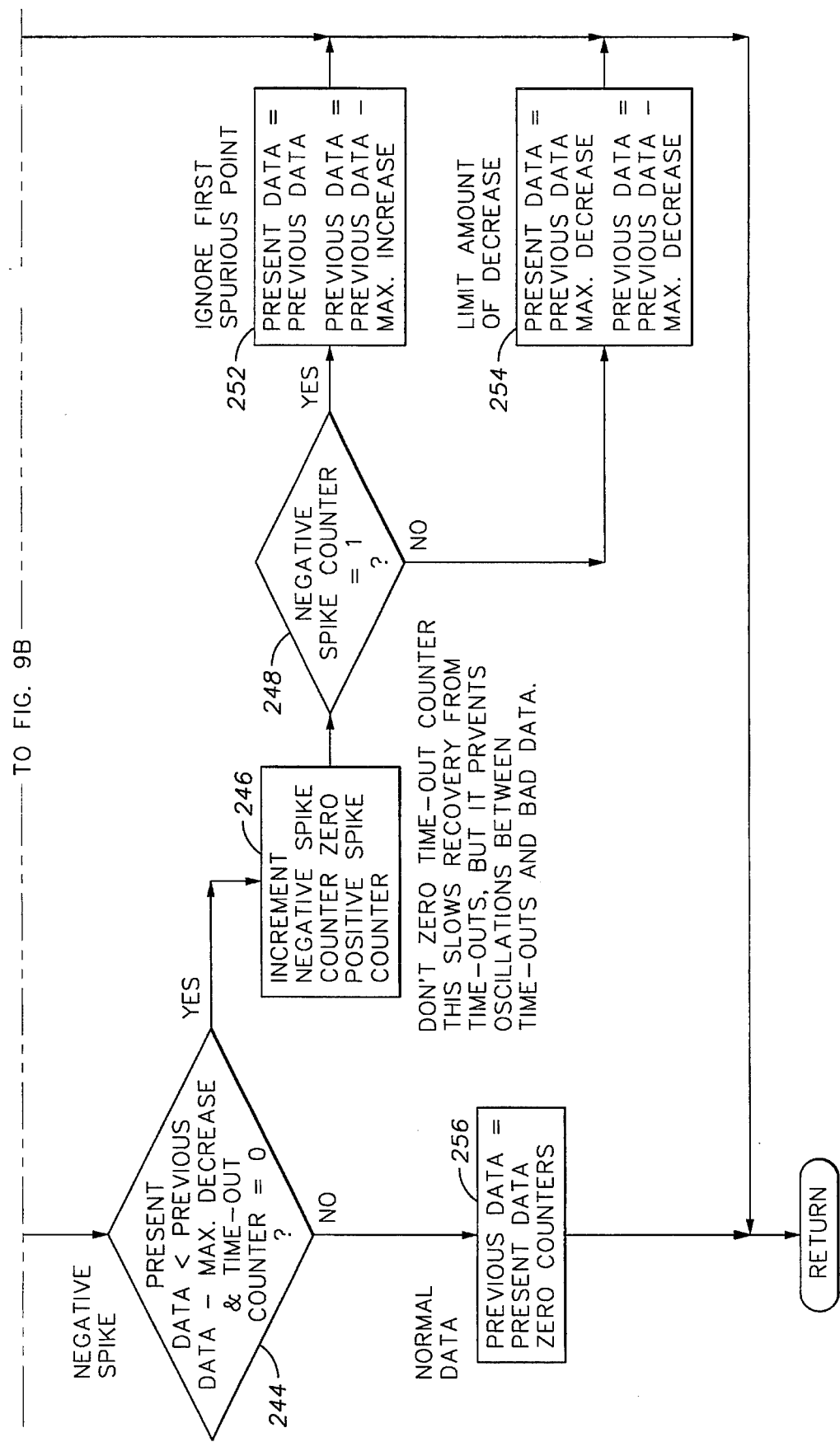

According to the preferred embodiment of the spike filter as shown in FIG. 9, in step 210, the CPU determines whether the transducer value is the first data point for that particular transducer. If it is, in step 212 the value for Previous Data and Data Before Previous are set equal to the first data reading. Subsequently, the CPU determines the Previous Increase in step 216 by subtracting Data Before Previous from Previous Data. In step 218, the Previous Increase is checked to see if it is less than zero. If Previous Increase is less than zero, the Maximum Increase value is set equal to 10% of the Previous Data, and the Maximum Decrease value is set equal to the negative of the Previous Increase plus 10% of the Previous Data, in step 220. Conversely, if the Previous Increase was equal to or greater than zero, in step 222 the Maximum Increase value is set equal to the Previous Increase plus ten percent of the Previous Data, while the Maximum Decrease value is set equal to ten percent of the Previous Data. In addition, the Data Before Previous is set equal to the Previous Data in step 222.

In step 224, the CPU determines if a time-out condition exists. If so, then in step 226, the CPU increments the Time-Out Counter, and clears the Positive Spike Counter and the Negative Spike Counter. After the Time-Out Counter has been incremented, the CPU checks the value of the Time-Out Counter to determine if it is less than or equal to ten. If the value is less than or equal to ten, then the time-out is rejected and the Present Data is set equal to the Previous Data in step 230. If, conversely, the value in the Time-Out Counter is greater than ten, the time-out is deemed valid and in step 232 the Previous Data is set equal to the Present Data.

The CPU determines if a positive spike has occurred in step 234 by comparing the Present Data with the sum of the Previous Data and the Maximum Increase value. If the Present Data is greater than the Previous Data plus the Maximum Increase, a positive spike condition is identified and the CPU branches to step 236 where the positive spike counter is incremented and the Time-Out and Negative Spike Counter are cleared. In step 238, the value in the Positive Spike Counter is checked to determine if it is equal to one. If it is, the CPU ignores the first spike and in step 240, sets the Present Data equal to the Previous Data, and sets the Previous Data equal to the Previous Data plus the Maximum Increase value. If the Positive Spike Counter has a value other than one, then in step 242 the amount of increase is limited by the Maximum Increase value by setting the Present Data equal to the Previous Data plus the Maximum Increase value, and the Previous Data is set equal to the Previous Data plus the Maximum Increase value.

The CPU determines if a negative spike condition exists in step 244 by comparing the Present Data with the Previous Data minus the Maximum Decrease. If the Present Data is less than this value, and if the Time-Out Counter is equal to zero, then a negative spike condition is identified and the CPU branches to step 246. In step 246, the CPU increments the Negative Spike Counter and clears the Positive Spike Counter. The Zero Time-Out Counter is not zeroed to prevent oscillation between time-out and bad data. Next, in step 248, the CPU checks the value of the Negative Spike Counter to see if it is the first negative spike. If so, the spike is ignored, and in step 252, the Present Data is set equal to the Previous Data, and the Previous Data is set equal to the Previous Data minus the Maximum Decrease value. Conversely, if the value in the Negative Spike Counter is anything other than one, the amount of the decrease is limited in step 254, wherein the Present Data is set equal to the Previous Data minus the Maximum Decrease and the Previous Data is set equal to the Previous Data minus the Maximum Decrease.

If the data is found to be normal by the CPU in steps 224, 234 and 244 (i.e., no time-out, or positive or negative spike), in step 256 the Previous Data is set equal to the Present Data and the counters are cleared.

Returning again to FIG. 7, after the ultrasonic signals have been filtered, the measurement sums preferably are updated in step 134 according to the following source code instructions for each of the discrete energy window measurements:

(TABLE III)

UPDATE MEASUREMENT SUMS

```
I = INT(S,/2)
DO for each density measurement
    Dens Measure Sum = Dens Measure Sum + Dens Measure * Dens Wt(I)
END DO
Dens Wtd Standoff Sum = Dens Wtd Standoff Sum + Dens Wt(I) * S,
Dens Wt Sum = Dens Wt Sum + Dens Wt(I)
Dens Wt2 Sum = Dens Wt2 Sum + Dens Wt(I)**2
Neut Near Sum = Neut Near Sum + Neut Near * Neut Wt(I)
Neut Far Sum = Neut Far Sum + Neut Far * Neut Wt(I)
Neut Wtd Standoff Sum = Neut Wtd Standoff Sum + Neut Wt(I) *S,
Neut Wt Sum = Neut Wt Sum + Neut Wt(I)
Neut Wt2 Sum = Neut Wt2 Sum + Neut Wt(I)**2
```

(TABLE III)-continued

UPDATE MEASUREMENT SUMS

Dens Q Near Sum = Dens Q Near Sum + Dens Q Near
Dens Q Far Sum = Dens Q Far Sum + Dens Q Far Referring still to FIG. 7, after the output of the spike filter for transducer 48A (the standoff transducer) is received by the CPU at step 132, the CPU preferably scales the standoff distance to obtain an index element value I relating to the standoff distance. In the preferred embodiment, this is done by setting I=INT($S_j$/2), where $S_j$ is the actual output signal from the standoff electronics 15 for transducer 48A. After the scaling is performed, the processor determines a density measurement sum for each of the energy windows by adding the previous density measurement sum to the product of the current density measurement count $C_i$ and the density weight factor $W_i$ (which is derived from the density weight factor calculations or alternatively is found in the look-up in ROM). Next, according to Table III, the processor determines a density weighted standoff sum by adding the previous density weighted standoff sum to the product of the density weight factor W and the standoff distance S. The processor determines the density weight sum, by adding the previous density weight sum to the current density weight $W_i$. Similarly, a second density weight sum is calculated by adding the previous second density weight sum to the current density weight squared ($W_i^2$). This same methodology preferably is used for each of the discrete energy windows for both the near and far density receivers.

Next, a neutron near sum and a neutron far sum are calculated, respectively, by adding the previous value to the product of the current count measurement and the current weight factor. The processor then determines a neutron weighted standoff sum, a neutron weight sum and a second neutron weight sum. Finally, the Q limit sums are updated in similar fashion. One skilled in the art will understand the foregoing source code and techniques can be modified in numerous ways without departing from the principles of the present invention.

Referring still to FIG. 7, after the measurement sums have been updated for each discrete energy window, the interval counter N is incremented in step 136, and in step 138, the interval counter N is compared with the limit value established in the initialization step 122. If the interval counter N is less than the limit value, the processor returns to step 128.

If the interval counter N is greater than or equal to the limit value, the processor computes and stores the averages in accordance with Equation (3) in step 140, according to the following source code in the preferred embodiment:

(TABLE IV)

COMPUTE AND STORE AVERAGES

```
If Dens Wt Sum > 0 THEN
    Dens Wtd Standoff = Dens Wtd Standoff Sum/Dens Wt Sum
    Dens Wt Ratio = Dens Wt2 Sum/Dens Wt Sum
    DO for each density measurement
        Dens Measure = Measurements per second * Dens Measure Sum/Dens Wt Sum
    END DO
ELSE
    Dens Wtd Standoff = FFFE Hexadecimal
    Dens Wt Ratio = FFFE Hexadecimal
    DO for each density measurement
        Dens Measure = FFFE Hexadecimal
    END DO
END IF
IF Neut Wt Sum > 0 THEN
    Neut Wtd Standoff = Neut Wtd Standoff Sum/Neut Wt Sum
    Neut Wt Ratio = Neut Wt2 Sum/Neut Wt Sum
    Neut Near = Measurement per second * Neut Near Sum/Neut Wt Sum
    Neut Far = Measurement per second * Neut Far Sum/Neut Wt Sum
ELSE
    Neut Wtd Standoff = FFFE Hexadecimal
    Neut Wtd Ratio = FFFE Hexadecimal
    Neut Near = FFFE Hexadecimal
    Neut Far = FFFE Hexadecimal
END IF
```

Thus, the processor determines if the density weight sum is greater than 0; that is, that valid data exists in the measurement counters and to prevent a zero from appearing in the denominator of Equation (3). If the density weight sum is equal to or less than 0, than an error message is stored for these values. If, conversely, density weight sum is greater than zero, the processor computes a density weighted standoff, which is a normalized standoff value, by dividing the density weighted standoff sum by the density weighted sum. The processor also computes a weight ratio. The processor then determines the average weighted counts $\overline{C}_W$ by dividing the density measurement sum (from Table IV) by the density weight sum (Table IV), in accordance with Equation (3). The processor then preferably multiplies the average weighted counts $\overline{C}_W$ by the number of measurements per second to determine the average weighted count rate value per second ($\overline{C}_W$/sec) for each of the discrete energy windows of the near and far density receivers.

Similarly, for the neutron measurements, a neutron weighted standoff and a neutron weight ratio are determined if the neutron weight sum is greater than 0, and measurements are obtained for the near and far receiver.

After the averages are computed, they preferably are stored in memory 92 downhole together with the date, the time, and any error messages. In addition, some or all of this data can be transmitted to the surface by conventional telemetry techniques. In step 142, the processor checks for errors, preferably by checking the status of the 16 bit Status Register. After this cycle is completed, the processor returns to step 124, where the interval counter N is cleared to begin the next averaging period.

While a preferred embodiment of the invention has been shown and described, modifications thereof can be made by one skilled in the art without departing from the spirit of the invention.

We claim:

1. A standoff compensation system for a downhole LWD tool, said LWD tool forming part of a bottomhole drilling assembly to drill a borehole, comprising:
   a sensor for measuring formation parameters based on nuclear count data and generating a signal indicative thereof;
   a sensor for determining the standoff distance between the borehole wall and the LWD tool and generating a signal indicative thereof;
   a downhole processor for receiving the signal indicative of standoff distance and developing a weight factor therefrom, said processor also receiving said signal indicative of the nuclear count data and modifying the nuclear count data based on said weight factor; and
   wherein the weight factor is determined based upon a weight function relationship.

2. A system as in claim 1, further comprising a look-up table stored in ROM, and wherein the weight factor is determined from said look-up table.

3. A system as in claim 1, wherein the weight factor is multiplied by the nuclear count data to obtain a weighted count value.

4. A standoff compensation system for a downhole logging tool in a borehole, comprising:
   a sensor for measuring formation parameters based on nuclear count data and generating a signal indicative thereof;
   a sensor for determining the standoff distance between the borehole wall and the logging tool and generating a signal indicative thereof;
   a downhole processor for receiving the signal indicative of standoff distance and developing a weight factor therefrom, said processor also receiving said signal indicative of the nuclear count data and multiplying the nuclear count data based by said weight factor to obtain a weighted count value; and
   wherein the processor determines an accumulated weighted count value by summing the weighted count value and each successive weighted count value determined during a predetermined averaging period.

5. A system as in claim 4, wherein the processor also obtains an accumulated weight factor by summing the weight factor and each successive weight factor during the predetermined averaging period.

6. A system as in claim 5, wherein the processor divides the accumulated weighted count value by the accumulated weight factor to determine an average weighted count value.

7. A method for weighting count data from a downhole sensor based upon standoff distance, comprising the steps of:
   (a) measuring standoff distance during a sampling interval;
   (b) determining a weight factor value based upon the measured standoff distance;
   (c) measuring count data during the sampling interval;
   (d) calculating a weighted count data value by multiplying the count data by the weight factor value;
   (e) repeating steps (a)–(d) for subsequent sampling intervals during an averaging period; and
   (f) summing the weighted count data values calculated during each sampling interval.

8. A method as in claim 7, further comprising the steps of:
   (g) summing the weight factor value during each sampling interval; and
   (h) determining an average weighted count rate by dividing the value determined in step (f) by the value determined in step (g).

9. A method as in claim 7, wherein the step of determining a weight factor value (step b) include the following steps:
   (b)(1) developing a continuous weight factor function for each possible standoff distance;
   (b)(2) determining the weight factor value based upon the weight factor function.

10. A method as in claim 9, wherein the weight factor function provides at least 255 possible weight factor values.

11. A method as in claim 7, further comprising the steps of:
    (a)(1) applying a spike filter to the standoff distance measured in step (a).

12. A method as in claim 11, wherein the spike filter includes the steps of:
    (a)(1)(a) establishing a threshold window for the standoff distance;
    (a)(1)(b) determining if the standoff distance is within the window;
    (a)(1)(c) modifying the standoff distance if the standoff distance is outside the window.

13. A method for determining an average weighted count value for logging count data in an averaging period, including the steps of:
    (a) determining a weight function;
    (b) determining the number of intervals in the averaging period;
    (c) reading count data from a logging sensor;
    (d) determining a weight factor for standoff distance based on weight function;
    (e) calculating a weighted count sum by multiplying the weight factor by the count data;
    (f) adding the weighted count sum calculated in step (e) to a previous weighted count sum; and
    (g) repeating steps (d)–(f) based upon the number of intervals calculated in step (b).

14. A method as in claim 13, further comprising the steps of:
    (g)(1) calculating a weight sum by adding the weight factor to a previous weight sum.

15. A method as in claim 14, further comprising the steps of
    (h) dividing the weighted count sum by the weight sum to obtain the average weighted count value.

16. A method as in claim 13, further comprising the step of (a)(1) determining count rate limits for each of a plurality of discrete energy windows.

17. A method of determining an average weighted count value for a plurality of discrete energy windows for both a near and a far density receiver, comprising the steps of:

(a) determining count rate limits for each discrete energy window;

(b) firing an acoustic wave transducer;

(c) receiving a reflected acoustic indicative of standoff distance;

(d) reading count data from both a near and a far density receiver;

(e) dividing the count data into discrete windows based upon energy level;

(f) determining a weight factor for the standoff distance measured in step (c) based upon a predetermined weight function; and (g) calculating a weighted count for each of the discrete windows by multiplying the weight factor by count data in that window.

18. A method as in claim 17, wherein a weighted count rate is determined for each window by repeating steps (b)-(g) and accumulating the weighted counts.

19. A method of applying a spike filter to standoff data in a standoff compensation system, including the steps of:

(a) setting a value for the maximum acceptable increase for standoff data;

(b) setting a value for the maximum acceptable decrease for standoff data;

(c) determining if a positive spike has occurred;

(d) determining if a negative spike has occurred; and (e) modifying the standoff data in response to an affirmative determination in any one of steps (c) or (d).

20. A method as in claim 19, further comprising the step of determining if a time-out condition exists, and in response, modifying the standoff data.

21. A method as in claim 20, wherein the step of determining if a time-out condition exists includes the steps of:

determining if less than ten time-out conditions have occurred; and rejecting the standoff data if less than ten time-out conditions have occurred.

22. A method as in claim 19, wherein the steps of determining whether a positive spike (step c) has occurred includes the steps of:

(c)(1) determining whether more than one positive spike has occurred; and (c)(2) limiting the standoff data in response to an affirmative determination in step (c)(1) by limiting the standoff data to previous standoff data plus the maximum acceptable increase.

23. A method as in claim 19, wherein the step of determining whether a negative spike (step d) has occurred includes the steps of:

(d)(1) determining whether more than one negative spike has occurred; and (d)(2) limiting the standoff data in response to an affirmative determination in step (d)(1) by setting the standoff data equal to previous standoff data minus the maximum acceptable decrease.

24. A method of filtering ultrasonic measurements from one or more ultrasonic transducers that are used to measure distances in a borehole, including the steps of:

(a) setting a value for the maximum acceptable increase in distance for each of the measurements based upon a previous distance measurement;

(b) setting a value for the maximum acceptable decrease in distance for each of the measurements based upon a previous distance measurement;

(c) determining if a positive spike has occurred in excess of the value set in step (a) for the measurement;

(d) determining if a negative spike has occurred in excess of the value set in step (a) for a measurement; and (e) modifying the measurement in response to an affirmative determination in either step (c) or (d).

25. A method as in claim 24, wherein the step of setting the maximum acceptable increase (step a) includes the step of;

(a)(1) setting the maximum acceptable increase equal to an increase in the previous distance measurement, if any, plus a percentage of the previous distance measurement.

26. A method as in claim 25, wherein the percentage is ten percent.

27. A method as in claim 24, wherein the step of setting the maximum acceptable decrease (step b) includes the step of;

(b)(1) setting the maximum acceptable decrease equal to a decrease in the previous distance measurement, if any, plus a percentage of the previous distance measurement.

28. A method as in claim 27, wherein the percentage is ten percent.

29. A method as in claim 24, wherein step (c) includes the steps of:

(c)(1) incrementing a positive spike counter each time a positive spike is detected; and (c)(2) ignoring the measurement if the value in the positive spike counter is equal to one.

30. A method as in claim 24, wherein step (d) includes the steps of;

(d)(1) incrementing a negative spike counter each time a negative spike is detected; and (d)(2) ignoring the measurement if the value in the negative spike counter is equal to one.

* * * * *